United States Patent
Sohma et al.

(10) Patent No.: US 9,746,605 B2
(45) Date of Patent: Aug. 29, 2017

(54) OPTICAL FIBER

(71) Applicant: SUMITOMO ELECTRIC INDUSTRIES, LTD., Osaka-shi, Osaka (JP)

(72) Inventors: Kazuyuki Sohma, Yokohama (JP); Takehiko Kawano, Yokohama (JP); Noriaki Iwaguchi, Yokohama (JP); Takashi Fujii, Yokohama (JP)

(73) Assignee: SUMITOMO ELECTRIC INDUSTRIES, LTD., Osaka-shi, Osaka (JP)

( * ) Notice: Subject to any disclaimer, the term of this patent is extended or adjusted under 35 U.S.C. 154(b) by 0 days.

(21) Appl. No.: 15/303,747

(22) PCT Filed: May 12, 2015

(86) PCT No.: PCT/JP2015/063631
§ 371 (c)(1),
(2) Date: Oct. 13, 2016

(87) PCT Pub. No.: WO2015/174410
PCT Pub. Date: Nov. 19, 2015

(65) Prior Publication Data
US 2017/0031092 A1     Feb. 2, 2017

(30) Foreign Application Priority Data
May 14, 2014 (JP) .................................. 2014-100461

(51) Int. Cl.
*G02B 6/02*     (2006.01)

(52) U.S. Cl.
CPC ..... *G02B 6/02395* (2013.01); *G02B 6/02019* (2013.01)

(58) Field of Classification Search
CPC ........ G02B 6/02; G02B 6/44; G02B 6/02019; G02B 6/02395
See application file for complete search history.

(56) References Cited

U.S. PATENT DOCUMENTS

| 6,014,488 | A | * | 1/2000 | Shustack | ............... | C03C 25/106 |
| | | | | | | 385/128 |
| 7,010,205 | B2 | * | 3/2006 | Fabian | ............... | G02B 6/02395 |
| | | | | | | 385/123 |

(Continued)

FOREIGN PATENT DOCUMENTS

| EP | 2 362 252 | 8/2011 |
| JP | 2014-107184 A | 4/2004 |

(Continued)

OTHER PUBLICATIONS

International Preliminary Report on Patentability dated Nov. 24, 2016 for PCT/JP2015/063631.

(Continued)

*Primary Examiner* — Jerry M Blevins
*Assistant Examiner* — Erin Chiem
(74) *Attorney, Agent, or Firm* — Drinker Biddle & Reath LLP

(57) ABSTRACT

An optical fiber 1A comprises an optical transmission member 10 including a core 12 and a clad 14, a primary resin layer 22, and a secondary resin layer 24. The effective area of the optical transmission member 10 is 130 μm$^2$ or larger. The transmission loss of the optical transmission member 10 at a wavelength of 1550 nm is 0.165 dB/km or smaller. The Young's modulus of the primary resin layer 22 is 0.7 MPa or lower, and the Young's modulus of the secondary resin layer 24 is 600 MPa or higher and 1500 MPa or lower. The difference between the transmission loss when the optical fiber 1A is wound at a tension of 80 g around a bobbin on which a metal mesh member having vertical wires of a 50-μm diameter and horizontal wires of a 50-μm diameter (Continued)

| PRIMARY RESIN | A | A | B | B | C | B |
|---|---|---|---|---|---|---|
| SECONDARY RESIN | S2 | S2 | S1 | S1 | S1 | S3 |
| FIBER DIAMETER[μm] | 125 | 125 | 125 | 125 | 125 | 125 |
| PRIMARY DIAMETER[μm] | 198 | 214 | 195 | 216 | 194 | 193 |
| SECONDARY DIAMETER[μm] | 244 | 247 | 241 | 246 | 243 | 243 |
| PRIMARY YOUNG'S MODULUS[MPa] | 0.11 | 0.14 | 0.45 | 0.70 | 0.75 | 0.40 |
| SECONDARY YOUNG'S MODULUS[MPa] | 600 | 820 | 1220 | 1310 | 1300 | 500 |
| TRANSMISSION LOSS[dB/km] | <0.165 | <0.165 | <0.165 | <0.165 | <0.165 | <0.165 |
| Aeff @λ=1.55μm[μm$^2$] | 163 | 166 | 144 | 138 | 130 | 136 |
| MESH LATERAL-PRESSURE TEST[dB/km] | 0.2 | 0.2 | 0.7 | 0.3 | 1.1 | 1.5 |
| RELAXATION TIME OF WINDING LOSS [STANDARD ≤2000 H] | OK | OK | OK | OK | NG | NG | are wound and spaced at a pitch of 150 μm, and the transmission loss of an optical fiber coil is 1.0 dB/km or smaller.

5 Claims, 4 Drawing Sheets

(56) References Cited

U.S. PATENT DOCUMENTS

| | | | |
|---|---|---|---|
| 7,105,583 B2* | 9/2006 | Hu | C03C 25/106 385/114 |
| 2008/0226913 A1* | 9/2008 | Cattron | C03C 25/1065 428/392 |
| 2011/0038593 A1 | 2/2011 | Chien et al. | |
| 2013/0343717 A1 | 12/2013 | Tachibana et al. | |
| 2016/0362579 A1* | 12/2016 | Schmid | C09D 175/16 |

FOREIGN PATENT DOCUMENTS

| | | |
|---|---|---|
| JP | 2005-202440 A | 7/2005 |
| JP | 2011-039109 | 2/2011 |
| JP | 2011-197667 | 10/2011 |
| JP | 2013-122502 A | 6/2013 |
| JP | 2014-006344 A | 1/2014 |

OTHER PUBLICATIONS

Szycher, Ph.D., Micheal, "Szycher's Handbook of Polyurethanes, First Edition," CRC Press, ISBN0849306027,9780849306020, 1999, Chapter 3, p. 3-17-p. 3-21.

* cited by examiner

Fig.3

| PRIMARY RESIN | A | A | B | B | C | B |
|---|---|---|---|---|---|---|
| SECONDARY RESIN | S2 | S2 | S1 | S1 | S1 | S3 |
| FIBER DIAMETER[μm] | 125 | 125 | 125 | 125 | 125 | 125 |
| PRIMARY DIAMETER[μm] | 198 | 214 | 195 | 216 | 194 | 193 |
| SECONDARY DIAMETER[μm] | 244 | 247 | 241 | 246 | 243 | 243 |
| PRIMARY YOUNG'S MODULUS[MPa] | 0.11 | 0.14 | 0.45 | 0.70 | 0.75 | 0.40 |
| SECONDARY YOUNG'S MODULUS[MPa] | 600 | 820 | 1220 | 1310 | 1300 | 500 |
| TRANSMISSION LOSS[dB/km] | <0.165 | <0.165 | <0.165 | <0.165 | <0.165 | <0.165 |
| Aeff @λ=1.55μm[μm²] | 163 | 166 | 144 | 138 | 130 | 136 |
| MESH LATERAL-PRESSURE TEST[dB/km] | 0.2 | 0.2 | 0.7 | 0.3 | 1.1 | 1.5 |
| RELAXATION TIME OF WINDING LOSS [STANDARD ≤2000 H] | OK | OK | OK | OK | NG | NG |

OPTICAL FIBER

TECHNICAL FIELD

The present invention relates to an optical fiber.

BACKGROUND

Patent Literature 1 discloses an optical fiber whose effective area is relatively large. Specifically, the optical fiber described in this literature comprises a central core, an optical clad and a jacket. The effective area of this optical fiber at a wavelength of 1550 nm is 110 $\mu m^2$ or more.

CITATION LIST

Patent Literature

Patent Literature 1: Japanese Patent Application Laid-Open No. 2013-122502

SUMMARY

Technical Problem

In an optical transmission network supporting a transmission rate of 100 Gbit/s or more, a higher optical signal-to-noise ratio (OSNR) is required for expanding the communication capability per the core of the optical fiber for a digital coherent communication technology including a multi-modulation technology. As one method for improving the OSNR, there is a method of increasing the effective area Aeff of the optical fiber and therewith suppressing the transmission loss of the optical fiber. The effective areas Aeff of general-purpose single-mode optical fibers (SMF) are about 80 $\mu m^2$ at a wavelength of 1550 nm. However, for effectively improving the OSNR, it is desirable that the effective area Aeff be 130 $\mu m^2$ or more.

However, when the effective area Aeff becomes large, the optical fiber becomes weak against the lateral pressure, and the transmission loss of the optical fiber wound on a bobbin tends to increase. Moreover, since the relaxation rate is slow, it requires a long time to change the magnitude of the transmission loss of the optical fiber wound on a bobbin, into the magnitude of the transmission loss of the optical fiber itself (for example, the transmission loss of an optical fiber coil). Therefore, proportion defective increases within a short period, or annealing time before shipment becomes longer and thereby stock increase.

The present invention has been made in view of such problems, and has an object to provide an optical fiber that makes it possible to increase the effective area Aeff while securing the resistance against the lateral pressure.

Solution to Problem

For solving the above-described problems, an optical fiber according to the present invention comprises: an optical transmission member including a core and a clad; a primary resin layer contacting with the optical transmission member and coating the optical transmission member; and a secondary resin layer coating the primary resin layer. The effective area of the optical transmission member is 130 $\mu m^2$ or larger. The transmission loss of the optical transmission member at a wavelength of 1550 nm is 0.165 dB/km or smaller. The Young's modulus of the primary resin layer is 0.7 MPa or lower. The Young's modulus of the secondary resin layer is 600 MPa or higher and 1500 MPa or lower. The outer diameter of the primary resin layer is 185 $\mu m$ or longer and 220 $\mu m$ or shorter. The outer diameter of the secondary resin layer is 225 $\mu m$ or longer and 260 $\mu m$ or shorter. The difference between the transmission loss when the optical fiber is wound at a tension of 80 g around a bobbin on which a metal mesh member having vertical wires of a 50-$\mu m$ diameter and horizontal wires of a 50-$\mu m$ diameter are wound and spaced at a pitch of 150 $\mu m$ and the transmission loss of an optical fiber coil is 1.0 dB/km or smaller.

Advantageous Effects of Invention

According to the optical fiber in the present invention, it is possible to increase the effective area Aeff while securing the resistance against the lateral pressure.

BRIEF DESCRIPTION OF THE DRAWINGS

FIG. 3 is a figure showing the result of variously setting the content ratio of a di-reactive termini oligomer and mono-reactive terminus oligomer that are contained in a primary resin layer and performing the mesh lateral-pressure test.

DETAILED DESCRIPTION

Description of Embodiments of Claimed Invention

Figure 1:
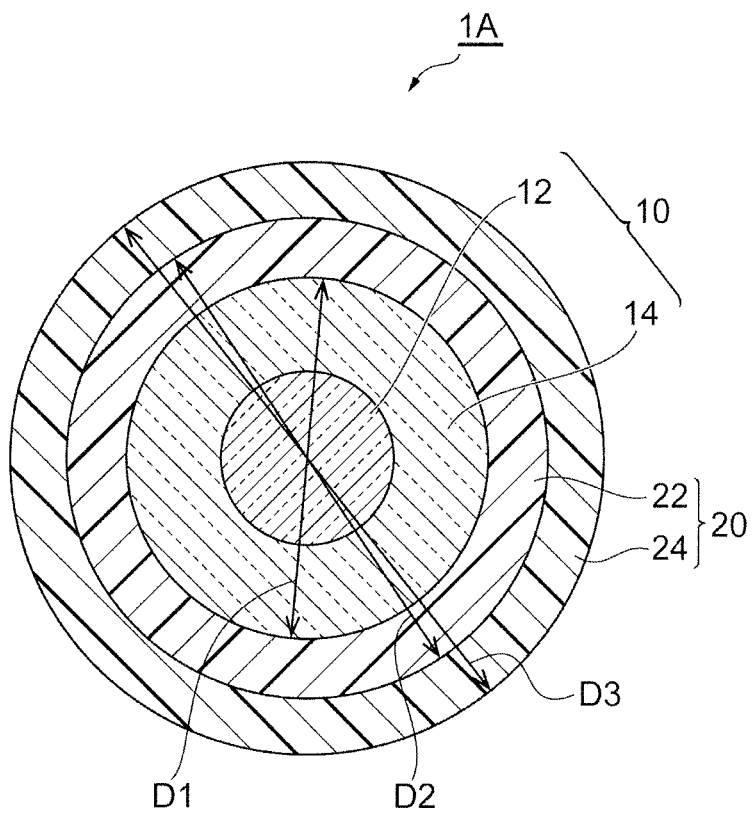
FIG. 1 is a cross-section view showing the configuration of an optical fiber according to an embodiment of the present invention, and illustrates a cross section perpendicular to the central axis direction (optical axis direction) of the optical fiber.

First, the contents of embodiments of the claimed invention are listed and described. (1) An optical fiber according to the invention comprises: an optical transmission member including a core and a clad; a primary resin layer contacting with the optical transmission member and coating the optical transmission member; and a secondary resin layer coating the primary resin layer. The effective area of the optical transmission member is 130 $\mu m^2$ or larger. The transmission loss of the optical transmission member at a wavelength of 1550 nm is 0.165 dB/km or smaller. The Young's modulus of the primary resin layer is 0.7 MPa or lower. The Young's modulus of the secondary resin layer is 600 MPa or higher and 1500 MPa or lower. The outer diameter of the primary resin layer is 185 $\mu m$ or longer and 220 $\mu m$ or shorter. The outer diameter of the secondary resin layer is 225 $\mu m$ or longer and 260 $\mu m$ or shorter. The difference between the transmission loss when the optical fiber is wound at a tension of 80 g around a bobbin on which a metal mesh member having of vertical wires of a 50-$\mu m$ diameter and horizontal wires of a 50-$\mu m$ diameter are wound and spaced at a pitch of 150 $\mu m$, and the transmission loss of an optical fiber coil is 1.0 dB/km or smaller.

As the result of a study by the inventors, it was found that even when the effective area Aeff is 130 $\mu m^2$ or larger, it is possible to suppress the difference between the transmission loss of the optical fiber wound on a bobbin and the transmission loss of an optical fiber coil, in a mesh lateral-pressure test, to a small value of 1.0 dB/km or smaller, if the Young's moduli and outer diameters of the primary resin layer and secondary resin layer meet the above ranges. That is, according to the above optical fiber, it is possible to increase the effective area Aeff while securing the resistance against the lateral pressure. Therefore, the relaxation time of the transmission loss of the optical fiber wound on a bobbin is short, and it is possible to obtain a high-quality optical fiber.

(2) Further, in the above optical fiber, the effective area of the optical transmission member may be 140 μm$^2$ or larger, and the Young's modulus of the primary resin layer may be 0.5 MPa or lower. Thereby, it is possible to further enhance the resistance against the lateral pressure.

(3) Further, in the above optical fiber, the effective area of the optical transmission member may be 150 μm$^2$ or larger, and the Young's modulus of the primary resin layer may be 0.3 MPa or lower. Thereby, it is possible to much more enhance the resistance against the lateral pressure.

(4) Further, in the above optical fiber, a time until the transmission loss difference of the optical fiber to the optical fiber coil become 0.003 dB/km or smaller from a point when the optical fiber has been just wound around the bobbin is 2000 hours or shorter. Thus, according to the above optical fiber, it is possible to shorten the relaxation time of winding loss.

Detail of Embodiments of Claimed Invention

Specific examples of the optical fibers according to the embodiments of the present invention will be described below, with reference to the drawings. Here, the present invention is not limited to these examples, and it is intended that all modifications in meanings and scopes shown in the claims and equivalent to the scope of the claims are included. In the following description, identical reference numerals are assigned to identical elements, in the description of the drawings, and the repetitive description is omitted.

Embodiment

FIG. 1 is a cross-section view showing the configuration of an optical fiber 1A according to an embodiment of the present invention, and illustrates a cross section perpendicular to the central axis direction (optical axis direction) of the optical fiber 1A. As shown in FIG. 1, the optical fiber 1A according to the embodiment comprises an optical transmission member 10 including a core 12 and a clad 14, and a coating resin layer 20 including a primary (first) resin layer 22 and a secondary (second) resin layer 24.

The optical transmission member 10 is a member made of glass, and for example, is composed of SiO$_2$ glass. The optical transmission member 10 transmits the light led into the optical fiber 1A. The core 12 is provided, for example, in a region containing the central axis line of the optical transmission member 10. The core 12 contains GeO$_2$, and may further contain fluorine. The clad 14 is provided in a region surrounding the core 12. The clad 14 has a lower refractive index than the refractive index of the core 12. The clad 14 may be composed of pure silica glass (SiO$_2$), or may be composed of a silica glass in which fluorine has been added. In an example, the outer diameter D1 of the optical transmission member 10 is 125 μm. As shown in an example described later, the effective area Aeff of the optical transmission member 10 may be 130 μm$^2$ or larger, may be 140 μm$^2$ or larger, or may be 150 μm$^2$ or larger. The upper limit value of the effective area Aeff is 180 μm$^2$, for example. The transmission loss of the optical transmission member 10 at a wavelength of 1550 nm is 0.165 dB/km or smaller.

As described above, the coating resin layer 20 has at least a double-layer structure that includes the primary resin layer 22 and the secondary resin layer 24. The primary resin layer 22 contacts with the outer periphery of the optical transmission member 10, and coats the whole of the optical transmission member 10. The secondary resin layer 24 contacts with the outer periphery of the primary resin layer 22, and coats the primary resin layer 22. In an example, the outer diameter D2 of the primary resin layer 22 is 185 μm or longer and 220 μm or shorter, and the layer thickness of the primary resin layer 22 is 30 μm or longer and 50 μm or shorter. Further, the outer diameter D3 of the secondary resin layer 24 is 225 m or longer and 260 μm or shorter, and the layer thickness of the secondary resin layer 24 is, for example, 10 μm or longer and 35 μm or shorter.

By softening the primary resin layer 22 (decreasing the Young's modulus), it is possible to increase the buffer effect by the coating resin layer 20 and to reduce the transmission loss of the optical fiber wound on a bobbin. In the embodiment, the Young's modulus of the primary resin layer 22 may be 0.7 MPa or lower, may be 0.5 MPa or lower, or may be 0.3 MPa or lower. Here, the lower limit value of the Young's modulus of the primary resin layer 22 is 0.07 MPa, for example. Further, by hardening the secondary resin layer 24 (increasing the Young's modulus), it is possible to secure the mechanical intensity of the coating resin layer 20. In the embodiment, the Young's modulus of the secondary resin layer 24 is 600 MPa or higher and 1500 MPa or lower.

As shown in the example described later, even when the effective area Aeff is 130 μm$^2$ or larger, it is possible to suppress the difference between the transmission loss (microbending loss) of the optical fiber wound on a bobbin and the transmission loss in the optical fiber coil, in a mesh lateral-pressure test, to a small value of 1.0 dB/km or smaller, if the Young's moduli and outer diameters of the primary resin layer 22 and secondary resin layer 24 meet the above ranges. Further, it is possible to decrease the time (relaxation time of winding loss) until the transmission loss difference of the optical fiber to the optical fiber coil become 0.003 dB/km or smaller from a point when the optical fiber has been just wound around the bobbin, to a short time of 2000 hours or shorter. Thus, according to the optical fiber 1A in the embodiment, it is possible to increase the effective area Aeff while securing the resistance against the lateral pressure. At the same time, it is possible to shorten the relaxation time of winding loss. Further, in the embodiment, in the case where the effective area of the optical transmission member 10 is 140 μm$^2$ or larger and the Young's modulus of the primary resin layer 22 is 0.5 MPa or lower, it is possible to further enhance the resistance against the lateral pressure. Further, in the embodiment, in the case where the effective area of the optical transmission member 10 is 150 μm$^2$ or larger and the Young's modulus of the primary resin layer 22 is 0.3 MPa or lower, it is possible to much more enhance the resistance against the lateral pressure.

Here, the lower the static friction coefficient of the outside of the coating resin layer 20 is, the shorter the relaxation time of winding loss is. As an example, it is preferable that the static friction coefficient be 1.5 or less.

Figure 2:
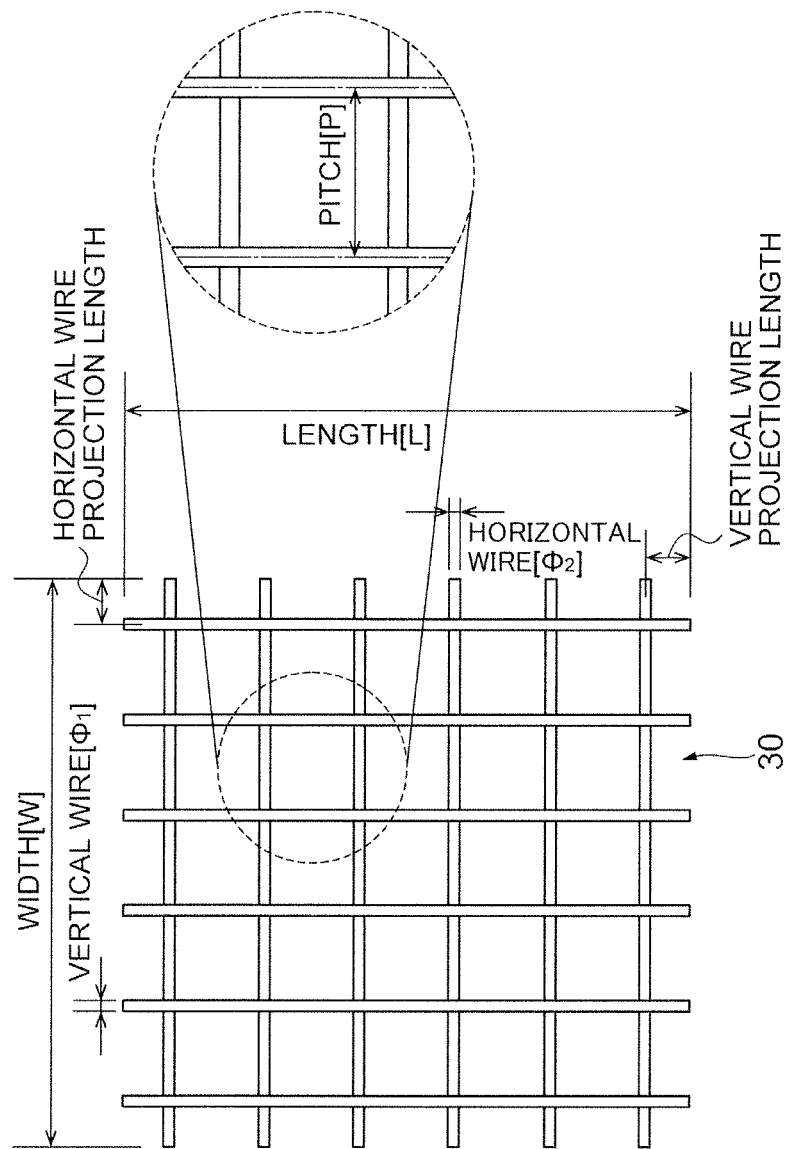
FIG. 2A is a diagram showing the configuration of a metal mesh member to be used in a mesh lateral-pressure test.
FIG. 2B is a partial enlarged view of FIG. 2A.

The mesh lateral-pressure test, for example, is performed as follows. FIG. 2A is a diagram showing the configuration of a metal mesh member 30 to be used in the mesh lateral-pressure test, and FIG. 2B is a partial enlarged view of FIG. 2A. As shown in FIGS. 2A and 2B, the metal mesh member 30 has a mesh shape in which a plurality of metal wires are put up in each of the vertical and horizontal directions. The vertical wire diameter $\phi_1$ and the horizontal wire diameter $\phi_2$ are 50 µm, for example. The pitch P between the central lines of vertical wires and between the central lines of horizontal wires is 150 µm, for example. The vertical wire projection length $L_1$ is 100 µm, for example, and the horizontal wire projection length $L_2$ is 100 µm, for example.

The mesh lateral-pressure test is performed by winding the optical fiber 1A, for example, at a tension of 80 g, around a bobbin in which the metal mesh member 30 shown in FIGS. 2A and 2B is wound around the drum of the bobbin without a gap and thereafter determining the difference between the transmission loss value of the optical fiber wound around the bobbin and the transmission loss value of an optical fiber coil (the optical fiber 1A detached from the bobbin). As the light source, a light source to output white light is used. Between the white light source and the optical fiber 1A, for example, an optical fiber for excitation having roughly the same structure as the optical fiber 1A and having a length of 100 m is provided. Then, the light output from the white light source is input to the input terminal of the optical fiber for excitation, the higher order mode is sufficiently attenuated while the light propagates along the optical fiber for excitation, and the fundamental mode light output from the optical fiber for excitation is input to the input terminal of the optical fiber 1A. By measuring the power of the light that is of the light output from the output terminal of the optical fiber 1A and that has a wavelength of 850 nm, the transmission loss value of the optical fiber wound on a bobbin is determined.

As the resin composing the primary resin layer 22 having the above property, resins containing, as the compositions, both or any one of di-reactive termini oligomers and mono-reactive terminus oligomers are suitable. Further, as shown in the example described later, when the mono-reactive terminus oligomer is contained at 50% or more, it is possible to sufficiently secure the resistance against the lateral pressure. Examples of the di-reactive termini oligomer include the following.

H-(I-polypropylene glycol$^A$)$_2$-I-H
H-(I-polypropylene glycol$^B$)$_2$-I-H
H-(I-polypropylene glycol$^C$)$_2$-I-H Further, examples of the mono-reactive terminus oligomer include the following.

H-(I-polypropylene glycol$^A$)$_2$-I-X
H-(I-polypropylene glycol$^B$)$_2$-I-X
H-(I-polypropylene glycol$^C$)$_2$-I-X Here, H represents the residue of hydroxyethyl acrylate, I represents the residue of isophorone diisocyanate, X represents methanol, and polypropylene glycols$^{A-C}$ represent the residues of the next polypropylene glycols, respectively. That is, polypropylene glycol$^A$ represents the residue of ACCLAIM 4200 (molecular weight: 4000, unsaturation degree: 0.003 meq/g), polypropylene glycol$^B$ represents the residue of XS-3020C (molecular weight: 3000, unsaturation degree: 0.03 meq/g), and polypropylene glycol$^C$ represents the residue of EXCENOL 3020 (molecular weight: 3000, unsaturation degree: 0.09 meq/g). Urethane oligomers are expressed as H-(I-polypropylene glycol)$_2$-I-H.

Here, the di-reactive termini oligomer and the mono-reactive terminus oligomer are not limited to the above materials. Examples other than the above include polypropylene glycols or copolymers of polypropylene glycol/polyethylene glycol in which the molecular weights are 1000 to 13000, preferably, 2000 to 8000 and the unsaturation degrees are less than 0.01 meq/g, preferably, 0.0001 to 0.009 meq/g, and that contain, as necessary, urethane compounds having at least one kind of (meta) acrylate group derived from mixtures between them and at least one kind of other polyol. Examples of the polypropylene glycol or the copolymer of polypropylene glycol/polyethylene glycol include 1,2-polypropylene glycol, 1,3-polypropylene glycol, and mixtures thereof. Among them, 1,2-polypropylene glycol is preferable. Further, it is allowable to be copolymers of propylene oxide and ethylene oxide that have a weight ratio of 100/0 to 70/30.

Further, examples of the resin composing the secondary resin layer 24 having the above property include the following. Examples of the oligomer include oligomers that are obtained by reacting polyol compounds, polyisocyanate compounds and hydroxyl group-containing acrylate compounds.

Examples of the polyol compound include polytetramethylene glycol and polypropylene glycol. Examples of the polyisocyanate compound include 2,4-tolylene diisocyanate and isophorone diisocyanate. Examples of the hydroxyl group-containing acrylate compound include 2-hydroxyethyl acrylate, 2-hydroxybutyl acrylate, 1,6-hexanediol monoacrylate, and tripropylene glycol diacrylate.

Examples of the monomer include N-vinyl monomers having ring structures, for example, N-vinyl caprolactam. It is preferable to contain these monomers, because the curing rate increases. In addition, mono-reactive monomers such as isobornyl acrylate, benzyl acrylate, 2-hydroxyethyl acrylate, phenoxyethyl acrylate and polypropylene glycol monoacrylate, and multifunctional monomers such as polyethylene glycol diacrylate, polypropylene glycol diacrylate or bisphenol A ethylene oxide-added dial diacrylate are used.

Example

The content ratio of the di-reactive termini oligomer and the mono-reactive terminus oligomer that are contained in the primary resin layer 22 was set as follows, and the above mesh lateral-pressure test was performed. FIG. 3 is a figure showing the test result.

Oligomer composition A: 100% mono-reactive terminus oligomer and 0% di-reactive termini oligomer
Oligomer composition B: 50% mono-reactive terminus oligomer and 50% di-reactive termini oligomer
Oligomer composition C: 20% mono-reactive terminus oligomer and 80% di-reactive termini oligomer Here, the Young's modulus is 0.1 MPa in the oligomer composition A, the Young's modulus is 0.4 MPa in the oligomer composition B, and the Young's modulus is 0.7 MPa in the oligomer composition C. That is, as the percentage of the di-reactive termini oligomer decreases and the percentage of the mono-reactive terminus oligomer increases, the Young's modulus falls. Further, the composition S1 of the secondary resin is such a composition that the Young's modulus is 1200 to 1300 MPa, the composition S2 is such a composition that the Young's modulus is 600 to 800 MPa, and the composition S3 is such a composition that the Young's modulus is 400 to 500 MPa. These compositions S1 to S3 make differences in Young's modulus by changing the number of crosslinking points in the molecule.

The case where the relaxation time of winding loss was 2000 hours or shorter was judged as being good (OK), and the case of exceeding 2000 hours was judged as being poor (NG). Samples wound on a cushioned bobbin with a winding tension 80 g and at a pitch 0.45 mm were evaluated. Further, the transmission loss of the optical transmission member 10 at a wavelength of 1550 nm was 0.165 dB/km or smaller. Here, when the transmission loss is 0.160 dB/km or smaller, it is possible to improve the OSNR more effectively, and to obtain a further excellent optical fiber 1A.

In the case where the primary resin layer 22 had the oligomer composition C, it was poor (NG) because the Young's modulus of the primary resin layer 22 was high. Further, in the case where the secondary resin layer 24 had the composition S3, it was poor (NG) because the Young's modulus of the secondary resin layer 24 was low. From FIG. 3, it is found that when the mesh lateral-pressure test result is 1.0 dB/km or smaller, the relaxation time of winding loss is 2000 hours or shorter. That is, in the case where the primary resin layer 22 had the oligomer composition A or B and the secondary resin layer 24 had the composition S1 or S2, the relaxation time of winding loss was good (OK), because the Young's modulus of the primary resin layer 22 was sufficiently low and the Young's modulus of the secondary resin layer 24 was sufficiently high.

Here, as for the upper limit of the Young's modulus of the secondary resin layer 24, when the secondary resin layer 24 is too hard, it is difficult to bend the optical fiber 1A, and the wiring of a cable including the optical fiber 1A is not easy. Therefore, the Young's modulus of the secondary resin layer 24 does not need to be excessively high, and preferably, should be 1500 MPa or lower.

Further, in FIG. 3, in some cases, even when the compositions of the resins are the same for both of the primary resin layer 22 and the secondary resin layer 24, the Young's moduli are different. This is because the Young's moduli are different depending on the cure extent of the resin. The cure extent of the resin varies depending on the ultraviolet irradiation quantity. In the example, the power of an ultraviolet lamp and the ultraviolet irradiation time (inversely proportional to linear velocity) are different little by little for each sample, and therefore, even when the compositions of the resins are the same, the Young's moduli are different.

Figure 4:
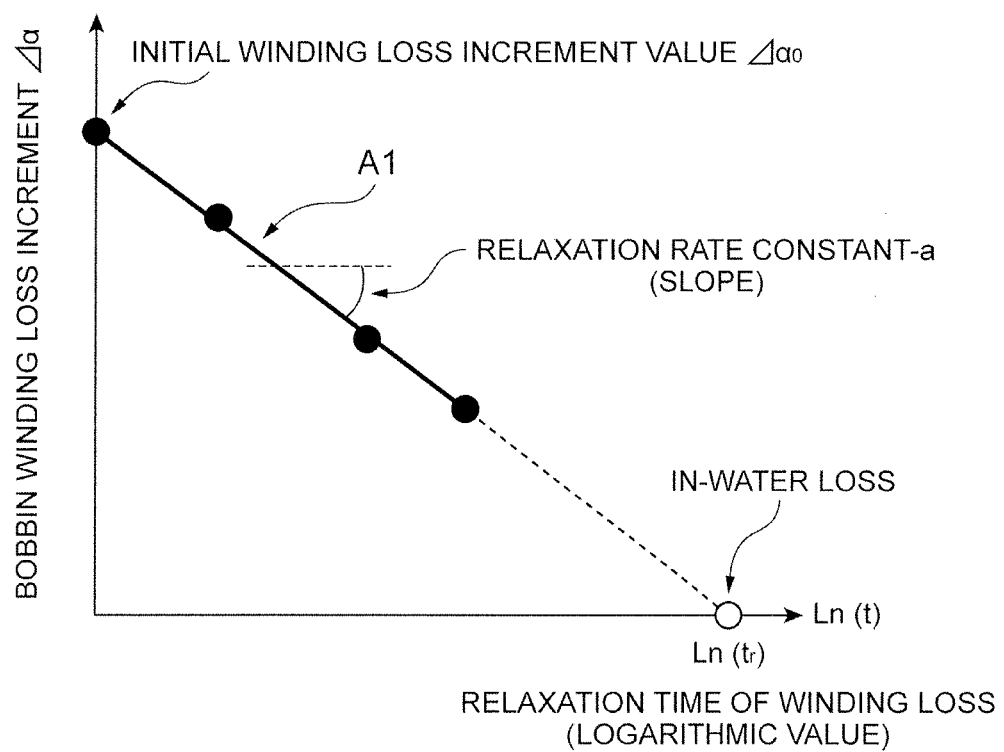
FIG. 4 is a graph for describing the calculation method for relaxation time of winding loss in an example.

FIG. 4 is a graph for describing the calculation method for the relaxation time of winding loss in the example. In FIG. 4, the ordinate indicates the increment $\Delta\alpha$ of the loss (winding loss), and the abscissa indicates the logarithmic value $\ln(t)$ of the time. The relaxation time of winding loss is suitably determined by measuring the decreased amount of the loss in the optical fiber 1A right after the optical fiber 1A is wound around the bobbin and determining the time before the loss decreases to 0.003 dB/km. Specifically, the transmission loss $\alpha(t)$ of the optical fiber 1A is measured for an appropriate time t. Further, a bundle of the optical fiber 1A is immersed in water, the transmission loss $\alpha(t\to\infty)$ under the condition (in-water bundle) of lateral pressure-free is measured, and the difference $\{\alpha(t)-\alpha(t\to\infty)\}$ is adopted as temporary attenuation increases due to rewinding $\Delta\alpha$.

$$\Delta\alpha = -a \times \ln(t_r) + \Delta\alpha_0 \quad (1)$$

As shown in FIG. 4, the slope a of an approximate straight line A1 is determined by plotting the correlation between $\Delta\alpha$ and $\ln(t)$ and performing the fitting. Here, $\Delta\alpha_0$ represents the initial value of the winding loss increment. Thereafter, the intersection point between the approximate straight line A1 and the abscissa ($\ln(t)$) is determined. The time $t_r$ at the intersection point is defined as the relaxation time of winding loss. The formula of the approximate straight line A1 is expressed as Formula 1. Further, specifically, it is possible to determine the attenuation relaxation due to rewinding $t_r$ from the following Formula (2).

$$t_r = \exp\left(\frac{\Delta\alpha_0}{a}\right) \quad (2)$$

REFERENCE SIGNS LIST

1A . . . optical fiber, 10 . . . optical transmission member, 12 . . . core, 14 . . . clad, 20 . . . coating resin layer, 22 . . . primary resin layer, 24 . . . secondary resin layer, 30 . . . metal mesh member, A1 . . . approximate straight line.

What is claimed is:
1. An optical fiber comprising:
an optical transmission member including a core and a clad;
a primary resin layer contacting with the optical transmission member and coating the optical transmission member; and
a secondary resin layer coating the primary resin layer,
wherein an effective area of the optical transmission member is 130 $\mu m^2$ or larger, a transmission loss of the optical transmission member at a wavelength of 1550 nm is 0.165 dB/km or smaller,
a Young's modulus of the primary resin layer is 0.7 MPa or lower, a Young's modulus of the secondary resin layer is 600 MPa or higher and 1500 MPa or lower,
an outer diameter of the primary resin layer is 185 $\mu m$ or longer and 220 $\mu m$ or shorter, an outer diameter of the secondary resin layer is 225 $\mu m$ or longer and 260 $\mu m$ or shorter, and
a difference between the transmission loss when the optical fiber is wound at a tension of 80 g around a bobbin on which a metal mesh member having vertical wires of a 50-$\mu m$ diameter and horizontal wires of a 50-$\mu m$ diameter are wound and spaced at a pitch of 150 $\mu m$, and the transmission loss of an optical fiber coil is 1.0 dB/km or smaller,
the primary resin layer comprises urethane oligomers including a di-reactive termini oligomer and a mono-reactive terminus oligomer, and
the mono-reactive terminus oligomer is included at 50% or more in the primary resin.
2. The optical fiber according to claim 1,
wherein the effective area of the optical transmission member is 140 $\mu m^2$ or larger, and the Young's modulus of the primary resin layer is 0.5 MPa or lower.
3. The optical fiber according to claim 1,
wherein the effective area of the optical transmission member is 150 $\mu m^2$ or larger, and the Young's modulus of the primary resin layer is 0.3 MPa or lower.
4. The optical fiber according to claim 1,
wherein a time until the transmission loss difference of the optical fiber to the optical fiber coil become 0.003 dB/km or smaller from a point when the optical fiber has been just wound around the bobbin is 2000 hours or shorter.
5. The optical fiber according to claim 1,
wherein the urethane oligomers include a residue of hydroxyethyl acrylate.

* * * * *